United States Patent
Jung et al.

(10) Patent No.: US 9,827,841 B2
(45) Date of Patent: Nov. 28, 2017

(54) WHEEL DRIVING SYSTEM FOR CONSTRUCTION MACHINERY

(71) Applicant: DOOSAN INFRACORE CO., LTD., Incheon (KR)

(72) Inventors: Eun-Soo Jung, Yongin-si (KR); Chang-Hyun Kim, Suwon-si (KR); Dong-Mok Kim, Incheon (KR); Lee-Hyoung Cho, Suwon-si (KR)

(73) Assignee: DOOSAN INFRACORE CO., LTD., Incheon (KR)

( * ) Notice: Subject to any disclaimer, the term of this patent is extended or adjusted under 35 U.S.C. 154(b) by 0 days.

(21) Appl. No.: 15/313,971

(22) PCT Filed: May 26, 2015

(86) PCT No.: PCT/KR2015/005227
§ 371 (c)(1),
(2) Date: Nov. 25, 2016

(87) PCT Pub. No.: WO2015/182944
PCT Pub. Date: Dec. 3, 2015

(65) Prior Publication Data
US 2017/0144530 A1    May 25, 2017

(30) Foreign Application Priority Data

May 27, 2014  (KR) .......................... 10-2014-0063771

(51) Int. Cl.
| | | |
|---|---|---|
| *B60K 6/46* | (2007.10) | |
| *E02F 9/02* | (2006.01) | |
| *B60K 17/16* | (2006.01) | |

(52) U.S. Cl.
CPC ................ *B60K 6/46* (2013.01); *B60K 17/16* (2013.01); *E02F 9/02* (2013.01); *B60Y 2200/41* (2013.01); *Y10S 903/903* (2013.01)

(58) Field of Classification Search
CPC ... B60K 6/46; B60K 17/16; E02F 9/02; E02F 9/20
See application file for complete search history.

(56) References Cited

U.S. PATENT DOCUMENTS

| | | | | |
|---|---|---|---|---|
| 6,631,773 | B1* | 10/2003 | Walker ................... | B60K 17/16 180/14.4 |
| 6,773,368 | B1* | 8/2004 | Williames .............. | B60K 17/16 475/74 |
| 8,561,744 | B1* | 10/2013 | Belloso ................... | B60K 5/08 180/69.6 |
| 9,637,000 | B2* | 5/2017 | Husson .................. | B60K 17/28 |

(Continued)

FOREIGN PATENT DOCUMENTS

| | | |
|---|---|---|
| EP | 1972725 A2 | 9/2008 |
| JP | 5387343 B2 | 1/2014 |

OTHER PUBLICATIONS

International Search Report dated Aug. 13, 2015 for PCT/KR2015/005227.

*Primary Examiner* — Erez Gurari
(74) *Attorney, Agent, or Firm* — Hauptman Ham, LLP

(57) ABSTRACT

A wheel driving system includes a generator connected to an engine and configured to generate electrical energy, a front axle configured to drive at least one front wheel and including a front electric motor configured to produce a driving torque from the electrical energy supplied from the generator and transmit the driving torque to the front wheel via a front drive shaft, a rear axle configured to drive at least one rear wheel and including a rear electric motor configured to produce a driving torque from the electrical energy supplied from the generator and transmit the driving torque to the rear wheel via a rear drive shaft, and a central connection unit operatively connected to the front drive shaft and the rear drive shaft and configured to transmit the driving torque between the front axle and the rear axle.

13 Claims, 4 Drawing Sheets

(56) References Cited

U.S. PATENT DOCUMENTS

| | | | | |
|---|---|---|---|---|
| 2002/0096886 A1* | 7/2002 | Schmitz | .................. | B60K 6/46 |
| | | | | 290/40 C |
| 2003/0080704 A1* | 5/2003 | Wakitani | .............. | A01D 34/006 |
| | | | | 318/432 |
| 2003/0125847 A1* | 7/2003 | Tinskey | .................. | B60K 6/46 |
| | | | | 701/1 |
| 2008/0104953 A1* | 5/2008 | Vigholm | .............. | E02F 9/2217 |
| | | | | 60/413 |
| 2008/0229626 A1* | 9/2008 | Bertoni | .................. | E02F 9/123 |
| | | | | 37/379 |
| 2012/0166029 A1* | 6/2012 | Rauner | .................... | B60K 6/52 |
| | | | | 701/22 |
| 2013/0149093 A1* | 6/2013 | Kaneko | ................ | E02F 9/0858 |
| | | | | 414/685 |
| 2013/0149176 A1* | 6/2013 | Kim | ........................ | F04C 2/102 |
| | | | | 417/410.4 |
| 2013/0187353 A1* | 7/2013 | Mock | ..................... | B60T 17/22 |
| | | | | 280/80.1 |
| 2015/0047916 A1* | 2/2015 | Moriki | ................. | E02F 9/2075 |
| | | | | 180/65.285 |
| 2015/0139767 A1* | 5/2015 | Moriki | ................. | E02F 9/2066 |
| | | | | 414/699 |
| 2015/0210151 A1* | 7/2015 | Husson | ................. | B60K 17/28 |
| | | | | 180/65.21 |
| 2016/0121721 A1* | 5/2016 | Lyle | .................... | B60K 17/356 |
| | | | | 180/243 |
| 2016/0263981 A1* | 9/2016 | Bunting | ................... | B60K 3/00 |
| 2016/0347167 A1* | 12/2016 | Dorsett | .................. | B60T 13/586 |
| 2017/0144530 A1* | 5/2017 | Jung | ........................ | B60K 6/46 |
| 2017/0197609 A1* | 7/2017 | Colvin | ................. | B60W 20/14 |

* cited by examiner

WHEEL DRIVING SYSTEM FOR CONSTRUCTION MACHINERY

CROSS REFERENCE TO RELATED APPLICATION

This application is the National Phase application of International Application No. PCT/KR2015/005227, filed May 26, 2015, which is based upon and claims the benefits of priorities under 35 U.S.C §119(a) of Korean Patent Application No. 10-2014-0063771, filed on May 27, 2014 with the Korean Intellectual Property Office (KIPO), the entire contents of which are incorporated herein by reference.

BACKGROUND

1. Field

Example embodiments relate to a wheel driving system for construction machinery. More particularly, Example embodiments relate to a wheel driving system for hybrid construction machinery.

2. Description of the Related Art

Recently, researches on hybrid driving system using an engine and a generator as a power source have been increased. In a general hybrid car, the generator may produce and supply electrical energy to one electric motor. The electric motor may generate driving torque to drive a plurality of wheels.

The general purpose of a wheel driving system in the general hybrid car is to travel. On the other hands, construction machinery including the hybrid driving system has to frequently perform a high load work as well as a general drive. Accordingly, a plurality of wheels of the construction machinery including the hybrid driving system may be driven by a plurality of electric motors respectively, while exerting high torques on the ground under a specific working environment.

Considering that the construction machinery frequently performs a high load work under a specific working environment and the wheels of the construction machinery are driven by the electric motor respectively, a new hybrid driving system capable of improving wheel driving efficiency may be required.

SUMMARY

Example embodiments provide a wheel driving system capable of improving wheel driving efficiency.

According to example embodiments, a wheel driving system includes a generator connected to an engine and configured to generate electrical energy, a front axle configured to drive at least one front wheel and including a front electric motor configured to produce a driving torque from the electrical energy supplied from the generator and transmit the driving torque to the front wheel via a front drive shaft, a rear axle configured to drive at least one rear wheel and including a rear electric motor configured to produce a driving torque from the electrical energy supplied from the generator and transmit the driving torque to the rear wheel via a rear drive shaft, and a central connection unit operatively connected to the front drive shaft and the rear drive shaft and configured to transmit the driving torque between the front axle and the rear axle.

In example embodiments, the front wheel may include a front left wheel and a front right wheel, and the front drive shaft may include a front left drive shaft connected to the front left wheel and a front right drive shaft connected to the front right wheel. The wheel driving system may further include a front drive shaft connection unit configured to connect the front left drive shaft and the front right drive shaft. The central connection unit may be operatively connected to the front drive shaft connection unit.

In example embodiments, the front drive shaft connection unit may include a differential gear.

In example embodiments, the rear wheel may include a rear left wheel and a rear right wheel, and the rear drive shaft comprises a rear left drive shaft connected to the rear left wheel and a rear right drive shaft connected to the rear right wheel. The wheel driving system may further include a rear drive shaft connection unit configured to connect the rear left drive shaft and the rear right drive shaft. The central connection unit may be operatively connected to the rear drive shaft connection unit.

In example embodiments, the rear drive shaft connection unit may include a differential gear.

In example embodiments, the central connection unit may include a hollow steel pipe.

In example embodiments, the central connection unit may include a propeller shaft.

In example embodiments, the central connection unit may further include a torsional vibration damper configured to reduce torsion.

In example embodiments, the central connection unit may further include a torsional damper.

In example embodiments, the front axle may further include a front reduction gear and a front wheel brake on the front drive shaft, and the rear axle further comprises a rear reduction gear and a rear wheel brake on the rear drive shaft.

In example embodiments, the wheel driving system may further include an energy storage device electrically connected to the generator, the front electric motor and the rear electric motor respectively, to store the electrical energy.

In example embodiments, the energy storage device may be electrically connected to the generator, the front electric motor and the rear left electric motor through the combined inverter.

In example embodiments, the energy storage device may include a battery or a capacitor.

In hybrid construction machinery which operates frequently in a high load work state, a load may be concentrated on a front axle or a rear axle of the construction machinery. When a load is mainly concentrated on the front axle of the construction machinery, rear wheels may slip on the ground or spin with no traction thereby exerting no driving torque on the ground, and only front wheels of the front axle may exert a relatively high driving torque on the ground. In this case that a load is mainly concentrated on the front axle of the construction machinery, in a conventional hybrid construction, torques generated by rear electric motors for driving rear wheels may not be transmitted to front wheels, only front electric motors for driving the front wheels may produce relatively high driving torques for the load.

In a wheel driving system in accordance with example embodiments, front drive shafts may be connected to a front drive shaft connection unit, rear drive shafts may be connected to a rear drive shaft connection unit, and the front drive shaft connection unit and the rear drive shaft connection unit may be connected to the central connection unit. Accordingly, when a load is concentrated on the front axle of the construction machinery, driving torques generated by the rear electric motors may be transmitted to the front drive shafts through the rear drive shaft connection unit, the central connection unit and the front drive shaft connection unit.

Further, because the front electric motors and the rear electric motors share the load, capacities of the front and rear electric motors may not need to become greater. Accordingly, the size and the weight of the front and rear electric motors may be decreased, fuel efficiency of the construction machinery may be improved, and the construction machinery may be downsized.

Because the wheels are driven independently from each other, the construction machinery may escape easily from a slippery ground, an excellent steering stability may be obtained, and premature wearing of tires may be prevented.

BRIEF DESCRIPTION OF THE DRAWINGS

Example embodiments will be more clearly understood from the following detailed description taken in conjunction with the accompanying drawings.

DESCRIPTION OF EMBODIMENTS

Figure 1:
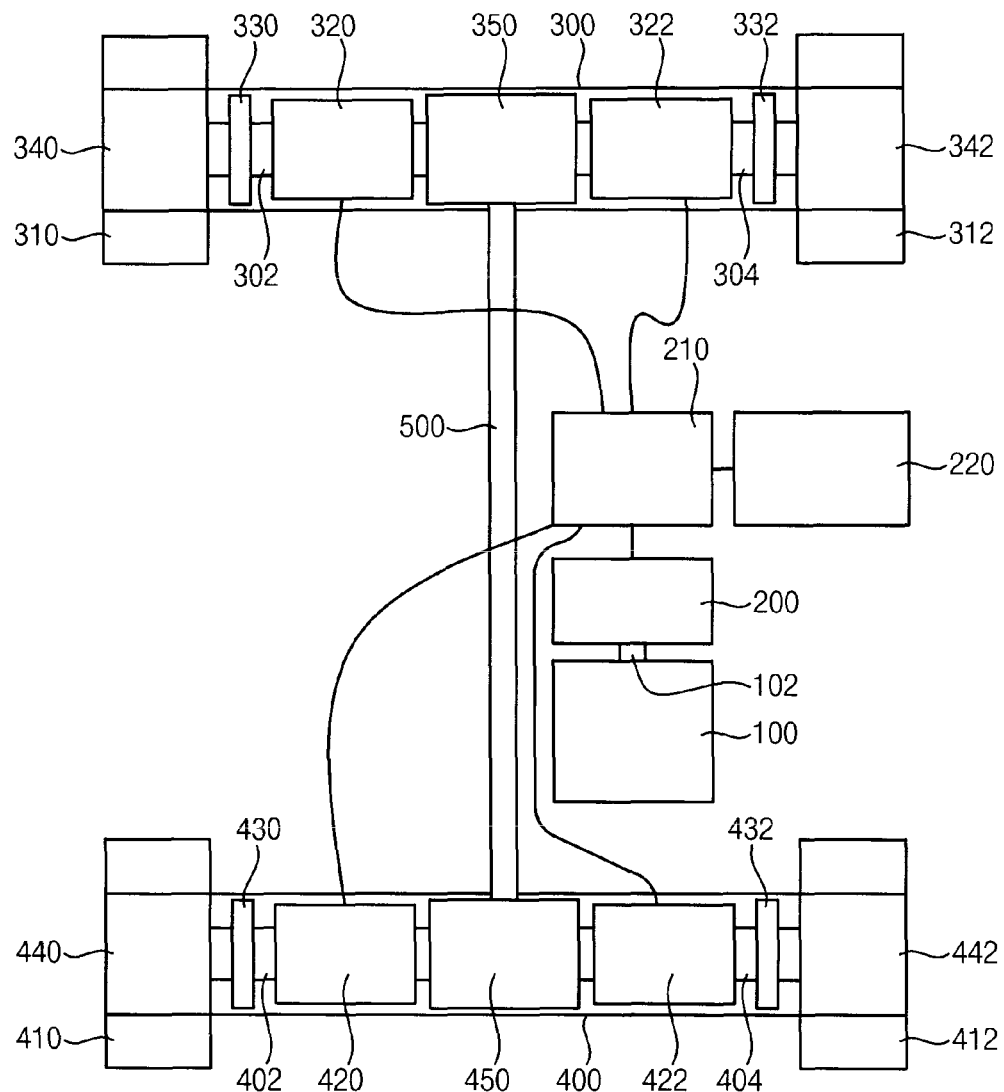
FIG. 1 is a diagrammatic view illustrating a wheel driving system in accordance with example embodiments.

Various example embodiments will be described more fully hereinafter with reference to the accompanying drawings, in which some example embodiments are shown. The present inventive concept may, however, be embodied in many different forms and should not be construed as limited to the example embodiments set forth herein. Rather, these example embodiments are provided so that this description will be thorough and complete, and will fully convey the scope of the present inventive concept to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, fourth etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concept.

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a diagrammatic view illustrating a wheel driving system in accordance with example embodiments.

Referring to FIG. 1, a wheel driving system may include a generator 200 connected to an engine 100 and configured to generate electrical energy, a front axle 300 configured to drive at least one front wheel and including a front electric motor configured to produce a driving torque from the electrical energy from the generator 200 and transmit the driving torque to the front wheel via a front drive shaft, a rear axle 400 configured to drive at least one rear wheel and including a rear electric motor configured to produce a driving torque from the electrical energy from the generator 200 and transmit the driving torque to the rear wheel via a rear drive shaft, and a central connection unit 500 operatively connected to the front drive shaft and the rear drive shaft.

In example embodiments, the front wheel may include a front left wheel 310 and a front right wheel 312, and the front drive shaft may include a front left drive shaft 302 connected to the front left wheel 310 and a front right drive shaft 304 connected to the front right wheel 312.

The front electric motor may include a front left electric motor 320 and a front right electric motor 322.

The rear wheel may include a rear left wheel 410 and a rear right wheel 412, and the rear drive shaft may include a rear left drive shaft 402 connected to the rear left wheel 410 and a rear right drive shaft 404 connected to the rear right wheel 312.

The rear electric motor may include a rear left electric motor 420 and a rear right electric motor 422.

The engine 100 may burn a fuel to generate a driving force and transmit the driving force to the generator 200 through an engine output shaft 102. For example, the engine 100 may be a diesel engine. Alternatively, the engine 100 may be a liquefied natural gas (LNG) engine, a compressed natural gas (CNG) engine, an adsorbed natural gas (ANG) engine, a liquefied petroleum gas (LPG) engine, a gasoline engine, etc.

A hydraulic pump (not illustrated) may be connected to the engine output shaft 102 such that the hydraulic pump is driven by the driving force. The hydraulic pump may discharge a hydraulic pressure fluid to drive actuators in order to operate a work apparatus of construction machinery. For example, the work apparatus may include a boom, a bucket, etc.

The generator 200 may be driven by the engine 100 to produce the electrical energy using electromagnetic induction. For example, the generator 200 may include an alternating current generator or a direction current generator. The generator 200 may supply the electrical energy to the front axle 300 and the rear axle 400 through a combined inverter 210.

The combined inverter 210 may change direct current to alternating current or may change alternating current to direct current. The combined inverter 210 may change the form of the current to electrically connect the generator 200, the front axle 300 and the rear axle 400 to each other. The combined inverter 210 may connect the components to each other, to thereby improving spatial efficiency of the construction machinery. In particular, the combined inverter 210 may be connected to the generator 200, the front left electric motor 320 and the front right electric motor 322 of the front axle 300, and the rear left electric motor 420 and the rear right electric motor 422 of the rear axle 400. Alternatively, a plurality of individual inverters (not illustrated) may be provided respectively for the generator 200, the front left electric motor 320 and the front right electric motor 322 of the front axle 300, and the rear left electric motor 420 and the rear right electric motor 422 of the rear axle 400.

In example embodiments, the wheel driving system may further include an energy storage device 220 which is electrically connected to the generator 200, the front left electric motor 320 and the front right electric motor 322 of the front axle 300, and the rear left electric motor 420 and the rear right electric motor 422 of the rear axle 400 respectively, to store the electrical energy. For example, the energy storage device 220 may be electrically connected to the generator 200, the front left electric motor 320 and the front right electric motor 322 of the front axle 300, and the rear left electric motor 420 and the rear right electric motor 422 of the rear axle 400 respectively, through the combined inverter 210.

The energy storage device 220 may include a battery, a capacitor, etc. For example, when the construction machinery is accelerated, the energy storage device 220 may store any excess electrical energy from the generator 200 through the combined inverter 210. When the construction machinery is decelerated, the energy storage device 220 may store any excess electrical energy from the front left electric motor 320, the front right electric motor 322, the rear left electric motor 420, and the rear right electric motor 422. When the generator 200 does not stably generate the electrical energy due to unstable supply of the driving force from the engine 100, the energy storage device 220 may stably supply the electrical energy to the front left electric motor 320, the front right electric motor 322, the rear left electric motor 420, and the rear right electric motor 422.

The front axle 300 may drive the front left wheel 310 and the front right wheel 312, and may include the front electric motor 320 and the front right electric motor 322 configured to produce a driving torque from the electrical energy supplied from the generator 200 and transmit the driving torque to the front left wheel 310 and the front right wheel 312 via the front left drive shaft 302 and the front right drive shaft 304 respectively.

For example, the front axle 300 may further include a front drive shaft connection unit 350 configured to connect the front left drive shaft 302 and the front right drive shaft 304.

The rear axle 400 may drive the rear left wheel 410 and the rear right wheel 412, and may include the rear electric motor 420 and the rear right electric motor 422 configured to produce a driving torque from the electrical energy supplied from the generator 200 and transmit the driving torque to the rear left wheel 410 and the rear right wheel 412 via the rear left drive shaft 402 and the rear right drive shaft 404 respectively.

For example, the rear axle 400 may further include a rear drive shaft connection unit 450 configured to connect the rear left drive shaft 402 and the rear right drive shaft 404.

The front left electric motor 320, the front right electric motor 322, the rear left electric motor 420 and the rear right electric motor 422 may receive the electrical energy from the generator 200 through the combined inverter 210 and produce the driving torque respectively. The front left electric motor 320, the front right electric motor 322, the rear left electric motor 420 and the rear right electric motor 422 may drive the front left wheel 310, the front right wheel 312, the rear left wheel 410 and the rear right wheel 412 via the front left drive shaft 302, the front right drive shaft 304, the rear left drive shaft 402 and the rear right drive shaft 404, respectively.

For example, the front left electric motor 320, the front right electric motor 322, the rear left electric motor 420 and the rear right electric motor 422 may include an alternating current electric motor or a direct current electric motor. The alternating current electric motor may be a three-phase motor. Alternatively, the direct current electric motor may be a single-phase motor.

The front left wheel 310 and the front right wheel 312 may be connected to the front left electric motor 320 and the front right electric motor 322 through the front left drive shaft 302 and the front right drive shaft 304 respectively to be driven by the front left electric motor 320 and the front right electric motor 322. The front left wheel 310 and the front right wheel 312 may support a load together with a tire (not illustrated) while transferring the driving torque acting on the ground. Additionally, the front left wheel 310 and the front right wheel 312 may perform steering and braking functions.

The front axle 300 may further include the front drive shaft connection unit 350 configured to connect the front left drive shaft 302 and the front right drive shaft 304. For example, the front drive shaft connection unit 350 may include a differential gear.

The front drive shaft connection unit 350 may transfer the driving torque from the central connection unit 500 as described later to the front left drive shaft 302 and the front right drive shaft 304 of the front axle 300. Additionally, the front drive shaft connection unit 350 may transfer the driving torque from the front left drive shaft 302 and the front right drive shaft 304 to the central connection unit 500. The front left wheel 310 and the front right wheel 312 respectively connected to the front left drive shaft 302 and the front right drive shaft 304 may rotate in different angular speeds from each other by the front drive shaft connection unit 350.

The rear left wheel 410 and the rear right wheel 412 may be connected to the rear left electric motor 420 and the rear right electric motor 422 through the rear left drive shaft 402 and the rear right drive shaft 404 respectively to be driven by the rear left electric motor 420 and the rear right electric motor 422. The rear left wheel 410 and the rear right wheel 412 may support a load together with a tire (not illustrated) while transferring the driving torque acting on the ground.

Additionally, the rear left wheel 410 and the rear right wheel 412 may perform steering and braking functions.

The rear axle 400 may further include the rear drive shaft connection unit 450 configured to connect the rear left drive shaft 402 and the rear right drive shaft 404. For example, the rear drive shaft connection unit 450 may include a differential gear.

The rear drive shaft connection unit 450 may transfer the driving torque from the central connection unit 500 as described later to the rear left drive shaft 402 and the rear right drive shaft 404 of the rear axle 400. Additionally, the rear drive shaft connection unit 450 may transfer the driving torque from the rear left drive shaft 402 and the rear right drive shaft 404 to the central connection unit 500. The rear left wheel 410 and the rear right wheel 412 respectively connected to the rear left drive shaft 402 and the rear right drive shaft 404 may rotate in different angular speeds from each other by the rear drive shaft connection unit 450.

The central connection unit 500 may be operatively connected to the front drive shaft and the rear drive shaft to transmit the driving torque between the front axle 300 and the rear axle 400.

For example, the central connection unit 500 may be connected to the front left drive shaft 302 and the front right drive shaft 304 through the front drive shaft connection unit 350, and may be connected to the rear left drive shaft 402 and the rear right drive shaft 404 through the rear left drive shaft 402 and the rear right drive shaft 404.

The central connection unit 500 may receive the driving torque from the rear left drive shaft 402 and the rear right drive shaft 404 through the rear drive shaft connection unit 450, and the central connection unit 500 may transmit the transferred driving torque to the front left drive shaft 302 and the front right drive shaft 304 through the front drive shaft connection unit 350. Additionally, the central connection unit 500 may receive the driving torque from the front left drive shaft 302 and the front right drive shaft 304 through the front drive shaft connection unit 350, and the central connection unit 500 may transmit the transferred driving torque to the rear left drive shaft 402 and the rear right drive shaft 404 through the rear drive shaft connection unit 450.

In example embodiments, the central connection unit 500 may include a hollow steel pipe capable of enduring a strong rotational force and torsional moment. Alternatively, the central connection unit 500 may include a composite material such as alloy, carbon fiber, etc for improving fuel efficiency or power transmission efficiency. For example, the central connection unit 500 may include a propeller shaft.

Additionally, the central connection unit 500 may be connected to the front drive shaft connection unit 350 and the rear drive shaft connection unit 450 through a universal joint (not illustrated) respectively.

The central connection unit 500 may further include a torsional vibration damper (not illustrated) configured to reduce torsion generated due to an instant difference between the average of the rotational speed of the front drive shaft (the front left drive shaft 302 and the front right drive shaft 304) and the average of the rotational speed of the rear drive shaft (the rear left drive shaft 402 and the rear right drive shaft 404). For example, when the construction machinery goes over bumpy ground, the torsional vibration damper may reduce torsion generated due to the instant difference between the average speed of the front left drive shaft 302 and the front right drive shaft 304 and the average speed of the rear left drive shaft 402 and the rear right drive shaft 404. For example, the central connection unit 500 may further include a torsional damper.

In example embodiments, the front axle 300 may further include a front left reduction gear 340 on the front left drive shaft 302 and a front right reduction gear 342 on the front right drive shaft 304. The front axle 300 may further include a front left wheel brake 330 on the front left drive shaft 302 and a front right wheel brake 332 on the front right drive shaft 304.

The rear axle 400 may further include a rear left reduction gear 440 on the rear left drive shaft 402 and a rear right reduction gear 442 on the rear right drive shaft 404. The rear axle 400 may further include a rear left wheel brake 430 on the rear left drive shaft 402 and a rear right wheel brake 432 on the rear right drive shaft 404.

The front left reduction gear 340, the front right reduction gear 342, the rear left reduction gear 440 and the rear right reduction gear 442 may reduce the rotational speeds of the front left wheel 310, the front right wheel 312, the rear left wheel 410 and the rear right wheel 412 respectively, to thereby increase torques of the front left wheel 310, the front right wheel 312, the rear left wheel 410 and the rear right wheel 412. The front left wheel brake 330, the front right wheel brake 332, the rear left wheel brake 430 and the rear right wheel brake 432 may brake the front left wheel 310, the front right wheel 312, the rear left wheel 410 and the rear right wheel 412 respectively.

Hereinafter, torques exerted on the ground by a plurality of wheels of a wheel driving systems in accordance with example embodiments and comparative example embodiments will be explained.

Figure 2:
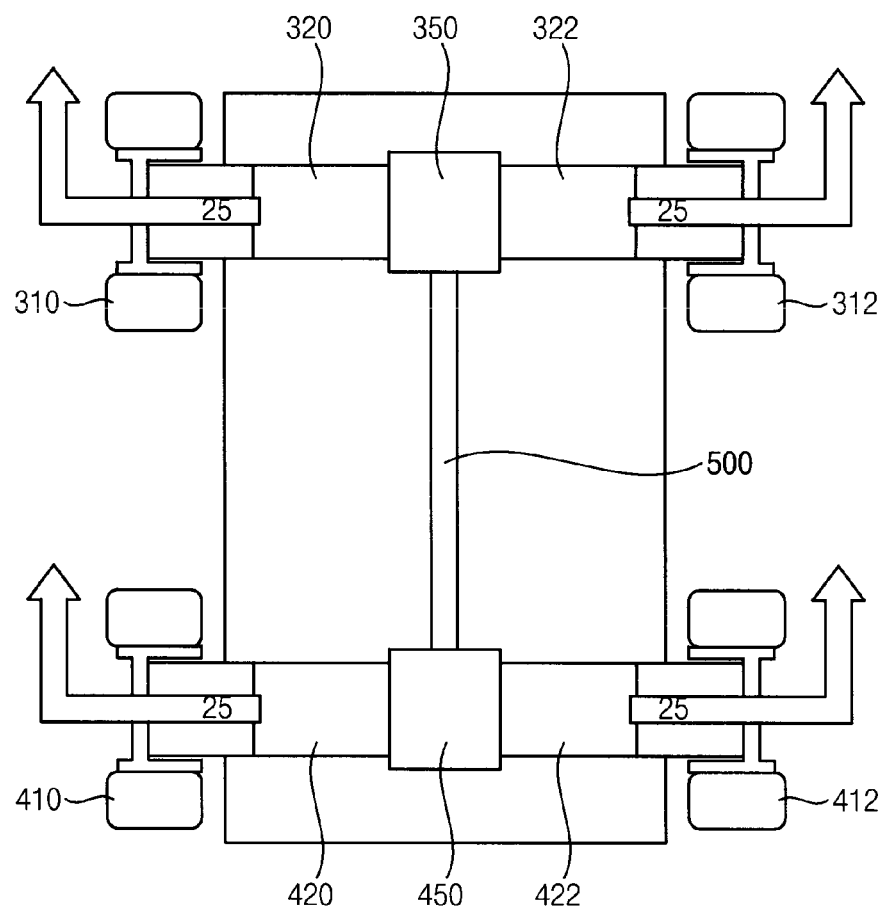
FIG. 2 is a diagrammatic view illustrating torques exerted on the ground by each wheels of the wheel driving system in FIG. 1, while operating in a normal travel state.
Figure 3:
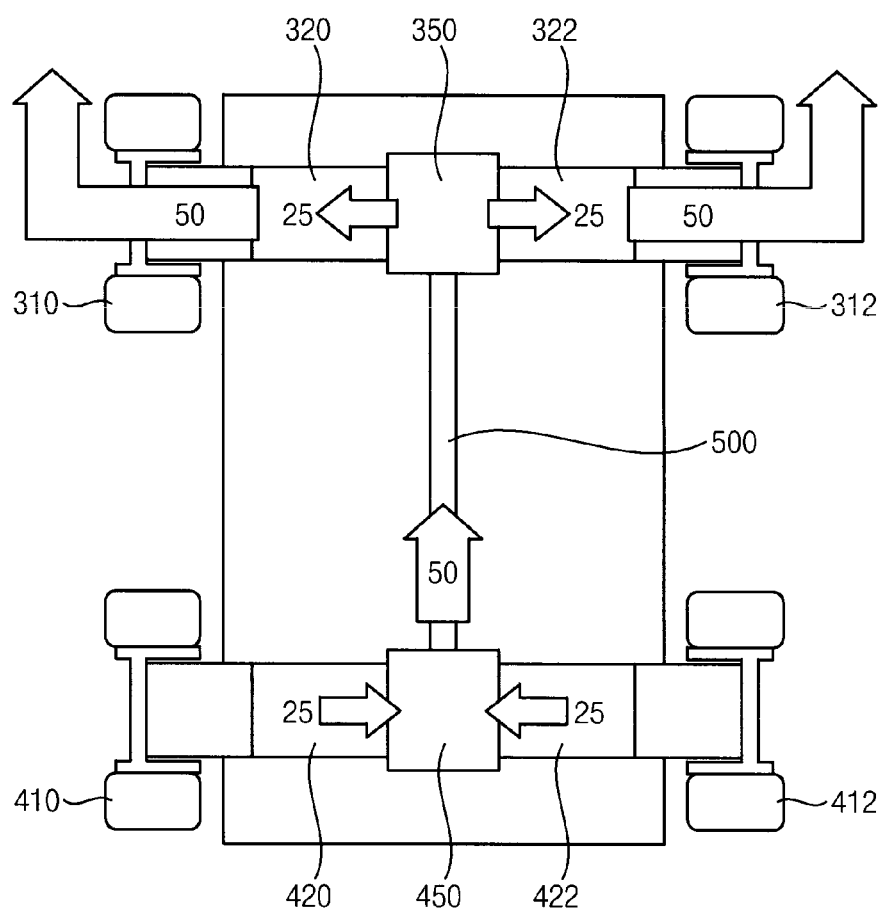
FIG. 3 is a diagrammatic view illustrating torques exerted on the ground by each wheels of the wheel driving system in FIG. 1, while operating in a high load work state.
Figure 4:
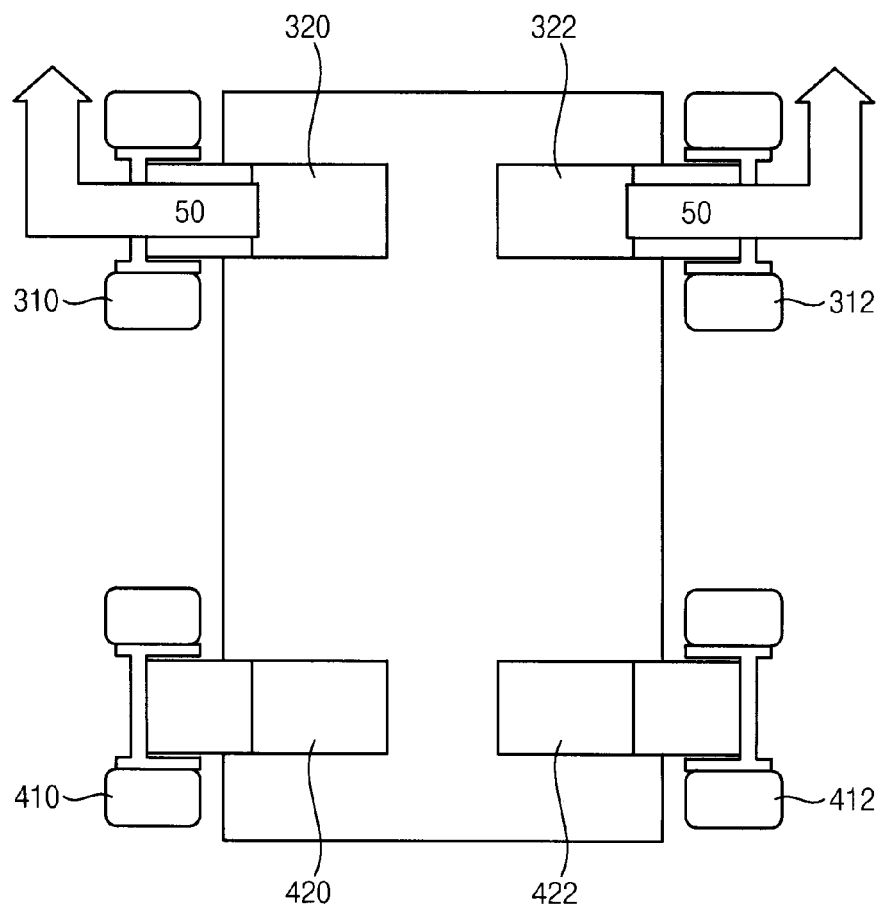
FIG. 4 is a diagrammatic view illustrating torques exerted on the ground by each wheels of a wheel driving system in accordance with comparative example embodiments, while operating in a high load work state.

FIG. 2 is a diagrammatic view illustrating torques exerted on the ground by each wheels of the wheel driving system in FIG. 1, while operating in a normal travel state. FIG. 3 is a diagrammatic view illustrating torques exerted on the ground by each wheels of the wheel driving system in FIG. 1, while operating in a high load work state. FIG. 4 is a diagrammatic view illustrating torques exerted on the ground by each wheels of a wheel driving system in accordance with comparative example embodiments, while operating in a high load work state.

Referring to FIGS. 2 to 4, while the construction machine operates in a normal travel state, the front left electric motor 320, the front right electric motor 322, the rear left electric motor 420 and the rear right electric motor 422 may supply a driving torque of about 25 respectively. The front left wheel 310, the front right wheel 312, the rear left wheel 410 and the rear right wheel 412 may exert the driving torque of about 25 acting on the ground respectively while the construction machine operates.

As illustrated in FIG. 3, when the construction machine operates in a high load work state, a load may be mainly concentrated on the front axle 300, and the rear left wheel 410 and the rear right wheel 412 driven by the rear axle 400 may slip on the ground or spin with no traction thereby exerting no torque on the ground. For example, when, in a forward excavation work state of a wheel loader, a traction work state of a tractor, etc, a load is concentrated on the front axle 300, no load or a little load may be exerted on the rear axle 400, and thus, the rear left wheel 410 and the rear right wheel 412 may slip on the ground and only the front left wheel 310 and the front right wheel 312 may exert a driving torque of about 50 on the ground respectively.

In the wheel driving system according to example embodiments, the front axle 300 and the rear axle 400 may be connected to each other by the central connection unit 500. Accordingly, the rotational speeds of the rear left wheel 410 and the rear right wheel 412 with slip on the ground may not be increased, the driving torque generated in the rear axle 400 may be transmitted to the front axle 300 through the central connection unit 500.

In particular, the driving torque produced by the rear left electric motor 420 and the rear right electric motor 422 may be transferred to the central connection unit 500 through the rear drive shaft connection unit 450. The driving torque of about 25 may be produced by the rear left electric motor 420 and the rear right electric motor 422 respectively, and the total driving torque of about 50 may be transferred to the central connection unit 500. The total driving torque of about 50 may be transferred to the front left wheel 310 and the front right wheel 312 through the front drive shaft connection unit 350. Accordingly, when the driving torque of about 25 is produced by the front left electric motor 320, the front right electric motor 322, the rear left electric motor 420 and the rear right electric motor 422 respectively, the driving torque of about 50 may be transferred to the front left wheel 310 and the front right wheel 312 respectively.

Therefore, in case that the rear left wheel 410 and the rear right wheel 412 of the rear axle 400 exert no driving torque or a little driving torque on the ground, the driving torque produced by the rear axle 400 may be transmitted to the front axle 300 through the central connection unit 500, to thereby reduce loads exerted on the front left electric motor 320, the front right electric motor 322, the rear left electric motor 420 and the rear right electric motor 422. Further, in case that a load is exerted on the front axle 300 or the rear axle 400, loads applied on each electric motors 320, 322, 420 and 422 may be properly distributed.

As illustrated in FIG. 4, in a wheel driving system in accordance with comparative example embodiments, a front left wheel 310 and a front right wheel 312 may be driven independently through a front left drive shaft 302 and a front right drive shaft 304 by a front left electric motor 320 and a front right electric motor 322. Additionally, a rear left wheel 410 and a rear right wheel 412 may be driven independently through a rear left drive shaft 402 and a rear right drive shaft 404 by a rear left electric motor 420 and a rear right electric motor 422.

When a load is exerted only on a front axle 300, the wheel driving system in accordance with comparative example embodiments does not transmit driving torques produced by the rear left electric motor 420 and the rear right electric motor 422 to the front axle 300. Accordingly, the front left electric motor 320 and the front right electric motor 322 have to produce and transmit driving torques of about 50 to the front left wheel 310 and the front right wheel 312 respectively.

Therefore, in the wheel driving system in accordance with comparative example embodiments, the front left electric motor 320 and the front right electric motor 322 may be provide to have high capacity, thereby deteriorating fuel efficiency due to a large size and a heavy weight, causing difficulties in miniaturization and rise in price level, etc. Further, because the driving torques generated by the rear left electric motor 420 and the rear right electric motor 422 are not transmitted to the front axle 300, wheel driving efficiency may be decreased greatly.

In the wheel driving system in accordance with example embodiments, the front left drive shaft 302 and the front right drive shaft 304 may be connected to the front drive shaft connection unit 350. The rear left drive shaft 402 and the rear right drive shaft 404 may be connected to the rear drive shaft connection unit 450. The front drive shaft connection unit 350 and the rear drive shaft connection unit 450 may be connected to the central connection unit 500.

Accordingly, when a load is concentrated on the front axle 300 of the construction machinery, the rear axle 400 may transmit the driving torque to the front axle 300 through the rear drive shaft connection unit 450, the central connection unit 500 and the front drive shaft connection unit 350.

Additionally, when a load is concentrated on the rear axle 400 of the construction machinery, the front axle 300 may transmit the driving torque to the rear axle 400 through the front drive shaft connection unit 350, the central connection unit 500 and the rear drive shaft connection unit 450.

Further, the front left electric motor 320, the front right electric motor 322, the rear left electric motor 420 and the rear right electric motor 422 may share the load through the front drive shaft connection unit 350, the central connection unit 500 and the rear drive shaft connection unit 450, to thereby reduce loads exerted on each electric motors 320, 322, 420 and 422. Accordingly, the size and the weight of the front left electric motor 320, the front right electric motor 322, the rear left electric motor 420 and the rear right electric motor 422 may be decreased, fuel efficiency of the construction machinery may be improved, and the construction machinery may be downsized.

Because the wheels are driven independently from each other, the construction machinery may escape easily from a slippery ground, an excellent steering stability may be obtained, and premature wearing of tires may be prevented.

The foregoing is illustrative of example embodiments of the invention and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims.

* Description of Reference numerals

| | |
|---|---|
| 100: engine | 102: engine output shaft |
| 200: generator | 210: combined inverter |
| 220: energy storage device | 300: front axle |
| 302: front left drive shaft | 304: front right drive shaft |
| 310: front left wheel | 312: front right wheel |
| 320: front left electric motor | 322: front right electric motor |
| 330: front left wheel brake | 332: front right wheel brake |
| 340: front right reduction gear | 342: front left reduction gear |
| 350: front drive shaft connection unit | 400: rear axle |
| 402: rear left drive shaft | 404: rear right drive shaft |
| 410: rear left wheel | 412: rear right wheel |
| 420: rear left electric motor | 422: rear right electric motor |
| 430: rear left wheel brake | 432: rear right wheel brake |
| 440: rear right reduction gear | 442: rear left reduction gear |
| 450: rear drive shaft connection unit | 500: central connection unit |

What is claimed is:

1. A wheel driving system, comprising:
    a generator connected to an engine and configured to generate electrical energy;
    a front axle configured to drive at least one front wheel and including a front electric motor configured to produce a driving torque from the electrical energy supplied from the generator and transmit the driving torque to the front wheel via a front drive shaft;
    a rear axle configured to drive at least one rear wheel and including a rear electric motor configured to produce a driving torque from the electrical energy supplied from the generator and transmit the driving torque to the rear wheel via a rear drive shaft; and a central connection unit operatively connected to the front drive shaft and the rear drive shaft and configured to transmit the driving torque between the front axle and the rear axle.

2. The wheel driving system of claim 1, wherein the front wheel comprises a front left wheel and a front right wheel, and the front drive shaft comprises a front left drive shaft connected to the front left wheel and a front right drive shaft connected to the front right wheel, further comprising a front drive shaft connection unit configured to connect the front left drive shaft and the front right drive shaft, and wherein the central connection unit is operatively connected to the front drive shaft connection unit.

3. The wheel driving system of claim 2, wherein the front drive shaft connection unit comprises a differential gear.

4. The wheel driving system of claim 1, wherein the rear wheel comprises a rear left wheel and a rear right wheel, and the rear drive shaft comprises a rear left drive shaft connected to the rear left wheel and a rear right drive shaft connected to the rear right wheel, further comprising a rear drive shaft connection unit configured to connect the rear left drive shaft and the rear right drive shaft, and wherein the central connection unit is operatively connected to the rear drive shaft connection unit.

5. The wheel driving system of claim 4, wherein the rear drive shaft connection unit comprises a differential gear.

6. The wheel driving system of claim 1, wherein the central connection unit comprises a hollow steel pipe.

7. The wheel driving system of claim 1, wherein the central connection unit comprises a propeller shaft.

8. The wheel driving system of claim 1, wherein the central connection unit further comprises a torsional vibration damper configured to reduce torsion.

9. The wheel driving system of claim 1, wherein the central connection unit further comprises a torsional damper.

10. The wheel driving system of claim 1, wherein the front axle further comprises a front reduction gear and a front wheel brake on the front drive shaft, and the rear axle further comprises a rear reduction gear and a rear wheel brake on the rear drive shaft.

11. The wheel driving system of claim 1, further comprising an energy storage device electrically connected to the generator, the front electric motor and the rear electric motor respectively, to store the electrical energy.

12. The wheel driving system of claim 11, wherein the energy storage device is electrically connected to the generator, the front electric motor and the rear left electric motor through the combined inverter.

13. The wheel driving system of claim 11, wherein the energy storage device comprises a battery or a capacitor.

* * * * *